(12) United States Patent
Nakayama

(10) Patent No.: US 7,002,787 B2
(45) Date of Patent: *Feb. 21, 2006

(54) CAPACITOR APPARATUS OF THE CAPACITY VARIABLE TYPE

(75) Inventor: Norikazu Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 11/104,908

(22) Filed: Apr. 13, 2005

(65) Prior Publication Data

US 2005/0254195 A1    Nov. 17, 2005

Related U.S. Application Data

(63) Continuation of application No. 10/450,867, filed as application No. PCT/JP02/10485 on Oct. 9, 2002, now Pat. No. 6,885,537.

(30) Foreign Application Priority Data

Oct. 18, 2001  (JP) ............................. 2001-321026

(51) Int. Cl.
    *H01G 7/00* (2006.01)
(52) U.S. Cl. .................... 361/277; 361/272; 361/278; 361/287; 361/290; 361/293
(58) Field of Classification Search ............... 361/277, 361/272, 278–280, 283.1, 287, 290, 292–293
See application file for complete search history.

(56) References Cited

U.S. PATENT DOCUMENTS

| | | | | |
|---|---|---|---|---|
| 5,557,495 A | * | 9/1996 | Belcher et al. | ........... 361/298.2 |
| 5,982,608 A | * | 11/1999 | Kalnitsky et al. | ............ 361/288 |
| 6,242,989 B1 | * | 6/2001 | Barber et al. | ........... 331/177 V |
| 6,377,438 B1 | * | 4/2002 | Deane et al. | ................ 361/278 |
| 6,606,235 B1 | * | 8/2003 | Chua et al. | .................. 361/278 |
| 6,856,499 B1 | * | 2/2005 | Stokes | ......................... 361/277 |

FOREIGN PATENT DOCUMENTS

| | | |
|---|---|---|
| JP | 09-082569 | 3/1997 |
| JP | 09-153436 | 6/1997 |

* cited by examiner

*Primary Examiner*—Nguyen T. Ha
(74) *Attorney, Agent, or Firm*—Robert J. Depke; Trexler, Bushnell, Giangiorgi, Blackstone & Marr, Ltd.

(57) ABSTRACT

The present invention is directed to a capacitor apparatus of the capacity variable type. This capacitor apparatus is manufactured by Micro Electro-Mechanical System technology, and comprises an insulating substrate (2) in which at least two capacitor electrodes (3), (4) are formed on one surface (2a) in the state where they are insulated each other, an actuator (5) formed by insulating material and having an external shape to bridge over the respective capacitor electrodes (3), (4), the actuator (5) being such that a conductor which respectively constitutes capacitors between the conductor (6) and these capacitor electrodes (3), (4), and drive means (7) for allowing this actuator (5) to undergo an operation to come into contact with one principal surface (2a) of the insulating substrate (2) or to become away therefrom.

4 Claims, 7 Drawing Sheets

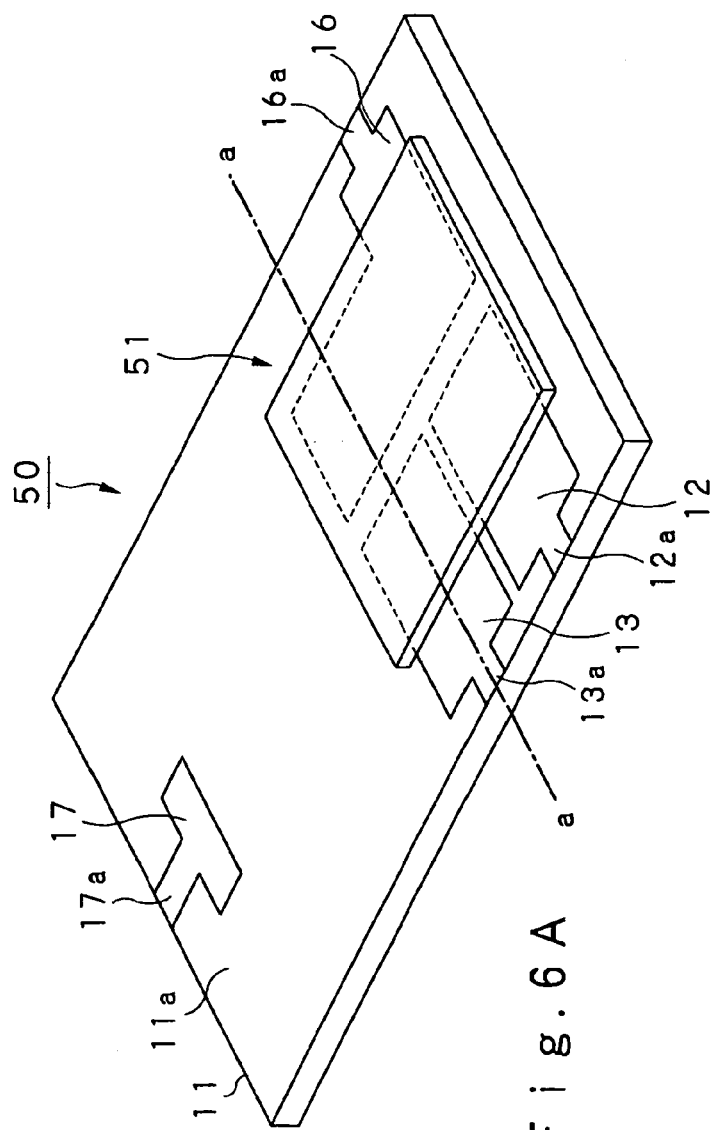
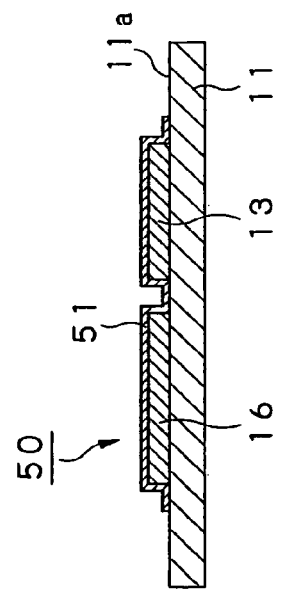
Fig. 6A
Fig. 6B

CAPACITOR APPARATUS OF THE CAPACITY VARIABLE TYPE

The subject matter of application Ser. No. 10/450,867 is incorporated herein by reference. The present application is a continuation of U.S. application Ser. No. 10/450,867, filed Nov. 24, 2003 now U.S. Pat. No. 6,885,537, which claims priority to International Application No. PCT/JP02/10485, filed Oct. 9, 2002, and Japanese Patnet Application Number JP2001-321026, filed Oct. 18, 2001. The present application claims priority to these previously filed applications.

TECHNICAL FIELD

The present invention relates to a capacitor apparatus of the capacity variable type manufactured by using Micro Electro-Mechanical System (MEMS) technology, and adapted for allowing electrostatic capacity to be variable and for reducing parasitic inductor component by draw-out of wiring.

BACKGROUND ART

For example, various information such as audio information or image information, etc, have been handled with ease by various communication terminal equipments with popularization of technology for realizing digitization of data and/or compression technology thereof, and preparation and expansion of communication system and/or service system for data, and availability thereof has been realized. Communication terminal equipments are small and light in weight and is excellent in portability, and can be used for a long time, and have no necessity of relay device, etc. so that connections to various communication systems can be realized. At the communication terminal equipment, at the transmitting/receiving unit, in order to carry out modulation/demodulation processing of analog high frequency signal, there is provided, e.g., high frequency transmitting/receiving circuit of the superheterodyne system or the direct conversion system, etc.

At the high frequency transmitting/receiving circuit, there are provided an antenna unit including an antenna and a changeover switch and serving to receive or transmit signal, a transmit/receive switching unit for carrying out switching between transmission and reception, a frequency converting circuit unit, a demodulation circuit unit, a modulation circuit unit, and a reference frequency generating circuit unit for supplying reference frequency, etc. At the high frequency transmitting/receiving circuit, there are provided various filters between respective stages, a Voltage Controlled Oscillator (VCO) for local oscillation in which capacity is caused to be variable, functional components such as Surface Acoustic Wave (SAW) filter, etc., a matching circuit, a bias circuit, and passive components such as inductor, resistor and/or capacitor, etc. In the high frequency transmitting/receiving circuit, for the above reason, the entirety becomes large and power consumption also becomes large. This is great obstacle to miniaturization and light weight, and realization of low power of communication terminal equipment.

With respect to the above-described voltage controlled oscillator, e.g., as described in the Japanese Patent Application Laid Open No. 82569/1997 publication, there is also employed a variable capacitor 100 in which the MEMS technology which forms very small electrodes or movable bodies, etc. on insulating substrate by the thin film technology or the thick film technology, etc. is used to thereby realize miniaturization. As shown in FIG. 1A, the variable capacitor 100 is composed of an insulating substrate 101, and a movable member 102 of which one end is cantilever-supported on one surface 101a of this insulating substrate 101.

At the insulating substrate 101, as shown in FIG. 1B, on one surface 101a, a rectangular drive electrode 103 and a rectangular detection electrode 104 are formed in the state where insulation therebetween is maintained with each other, and a pair of draw-out electrodes 105, 106 are formed in a manner positioned in correspondence with the supporting portion of the movable member 102. The movable member 102 has insulating property and elasticity, and is composed of a supporting portion 107 formed at one end portion, a fulcrum portion 108 formed on this supporting portion 107 in a projected manner, and a movable portion 109 integrally formed along one side portion of this fulcrum portion 108 and opposite to one surface 101a of the insulating substrate 101 with a predetermined spacing.

As shown in FIG. 1C, the movable portion 109 has an external shape sufficient to cover the drive electrode 103 and the detection electrode 104, and is adapted so that a first movable electrode 110 and a second movable electrode 111 are formed on the internal surface opposite to one surface 101a of the insulating substrate 101 respectively in correspondence with these drive electrodes 103 and 104. The first movable electrode 110 and the second movable electrode 111 are conducted from the internal surface of the movable portion 109 to the fulcrum portion 108 and the supporting portion 107, and the supporting portion 107 is respectively connected to the draw-out electrodes 105, 106 in the state fixed on one surface 101a of the insulating substrate 101.

In the variable capacitor 100 constituted as described above, when external bias voltage is applied to the drive electrode 103 and the draw-out electrode 105 connected to the first movable electrode 110, electrostatic force is generated between the drive electrode 103 and the movable electrode 110. In the variable capacitor 100, the movable portion 109 is attracted toward the drive electrode 103 side by this electrostatic force while allowing the fulcrum portion 108 to undergo elastic displacement. In the variable capacitor 100, opposite spacing between the detection electrode 104 and the second movable electrode 111 is prescribed in the state where electrostatic force and elastic force stored at the fulcrum portion 108 is balanced. Thus, taking-out of electrostatic capacity generated between these electrodes is carried out.

In the variable capacitor 100, by adjusting external bias voltage in a manner as described above, magnitude of electrostatic force is changed. Thus, opposite spacing between the detection electrode 104 and the second movable electrode 111 is also changed. Since electrostatic capacity generated between the detection electrode 104 and the second movable electrode 111 is proportional to inverse number of the opposite spacing, the variable capacitor 100 functions as capacitor of the variable-capacitance type.

Meanwhile, in the variable capacitor 100, as described above, external bias voltage is applied from the draw-out electrode 105 formed at the insulating substrate 101 to the first movable electrode 110 of the movable member 102 side. In the variable capacitor 100, parasitic inductance which serves as line resistance component is produced between the draw-out electrode 105 and the first movable electrode 110, and is connected in series with capacitor detected by the detection electrode 104 and the second movable electrode 111. Thus, LC resonator is constituted on the whole. Accordingly, in the variable capacitor 100, as the result of the fact that the parasitic inductance component becomes great, the entire resonance frequency is lowered. Thus, the frequency region where the variable capacitor 100 is operative as capacitor becomes narrow.

On the other hand, in the variable capacitor 100, in order to realize low power of equipment, it is necessary to employ a configuration such that the movable member 102 is driven by lower applied voltage, whereby large capacity change is produced between the detection electrode 104 and the second movable electrode 111. In the variable capacitor 100, as described above, external bias voltage sufficient to allow the fulcrum portion 108 to undergo elastic displacement is applied, whereby the opposite spacing between the detection electrode 104 and the second movable electrode 111 is changed. In the variable capacitor 100, consideration is also made such that, e.g., the fulcrum portion 108 is caused to be narrow beam portion to thereby reduce elastic displacement characteristic to realize low voltage drive. However, in the variable capacitor 100, by such countermeasure, there takes place the problem that wiring between the draw-out electrode 105 at the fulcrum portion 108 and the first movable electrode 110 becomes narrow so that line resistance component becomes large.

DISCLOSURE OF THE INVENTION

An object of the present invention is to provide a novel capacitor apparatus of the capacity variable type which can solve problems that conventional variable capacitors have.

Another object of the present invention is to provide a capacitor apparatus of the capacity variable type of the micro configuration which reduces parasitic inductor to permit operation in the high frequency band.

A capacitor apparatus of the capacity variable type according to the present invention proposed in order to attain the above described objects comprises: an insulating substrate manufactured by Micro Electro-Mechanical System technology and adapted so that at least two capacitors are formed on one surface in the state where insulation therebetween is maintained with each other; an insulating actuator having such an external shape to bridge over the respective capacitor electrodes and adapted so that conductors which respectively constitute capacitors are formed between the conductors and these capacitor electrodes; and drive means for carrying out an operation to allow this actuator to be in contact with the principal surface of the insulating substrate or to allow this actuator to be away therefrom.

In the capacitor apparatus of the capacity variable type according to the present invention, the actuator is caused to be close to the insulating substrate by the drive means to thereby respectively constitute capacitors between the respective capacitor electrodes and the conductors. In this capacitor apparatus of the capacity variable type, the actuator caused to undergo close operation with respect to the insulating substrate by the drive means suitably adjusts opposite spacing between the actuator and the insulating substrate, whereby respective capacitors having a predetermined electric capacity are constituted. In the capacitor apparatus of the capacity variable type, wiring with respect to the conductors formed at the actuator is caused to become unnecessary, whereby influence of the parasitic inductance with respect to respective capacitors is reduced. Accordingly, the capacitor apparatus of the capacity variable type constitutes a capacitor in which lowering of the entire resonance frequency is suppressed so that the operation in the high frequency hand can be made.

Another capacitor apparatus of the capacity variable type according to the present invention constitutes drive means of actuator by a fixed electrode for drive formed on one surface of an insulating substrate in the state where insulation with respect to respective capacitor electrodes is maintained, and a movable electrode for drive formed at the actuator in correspondence with an electrode for drive in the state where insulation with respect to a conductor is maintained.

In another capacitor apparatus of the capacity variable type according to the present invention, a predetermined drive voltage is applied to the drive fixed electrode and the drive movable electrode, whereby electrostatic force is produced between the drive fixed electrode and the drive movable electrode, and the actuator is driven by this electrostatic force. In this capacitor apparatus of the capacity variable type, since the actuator of the micro shape is driven by application of drive voltage after undergone positioning with high accuracy, capacitor in which low power consumption can be realized and accuracy is high can be constituted. In the capacitor apparatus of the capacity variable type, since the electric signal system for capacitor and the electric signal system for actuator drive are electrically insulated (isolated0 from each other, mutual interference between the electric signal system utilizing variable capacitor formed at very small spacing and the drive signal system for actuator is reduced. Thus, improvement in the accuracy can be made.

Still more objects of the present invention and practical merits obtained by the present invention will become more apparent from the description of the embodiments which will be given below with reference to the attached drawings.

BRIEF DESCRIPTION OF THE DRAWINGS

FIG. 6A is an essential part perspective view showing a capacitor apparatus of the capacity variable type shown as a fourth embodiment according to the present invention in the state where actuator is detached, and FIG. 6B is an essential part longitudinal cross sectional view thereof.

BEST MODE FOR CARRYING OUT THE INVENTION

A capacitor apparatus of the capacity variable type (hereinafter abbreviated as capacitor apparatus) according to the present invention will now be explained with reference to the attached drawings.

First, the capacitor apparatus according to the first embodiment of the present invention will be explained.

Figure 1A:
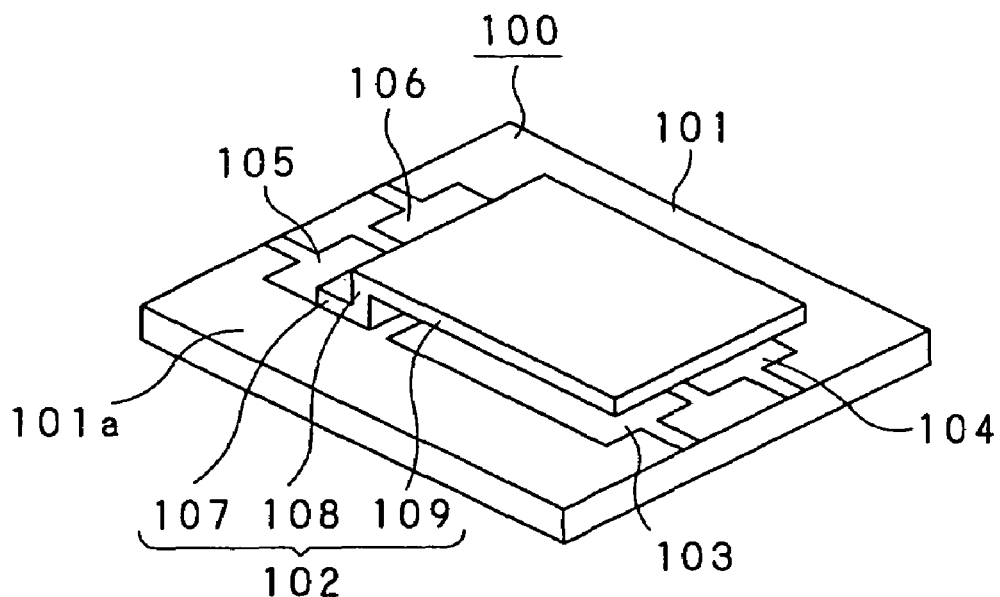
FIG. 1A is a perspective view showing a conventional capacitor apparatus of the capacity variable type.
Figure 1B:
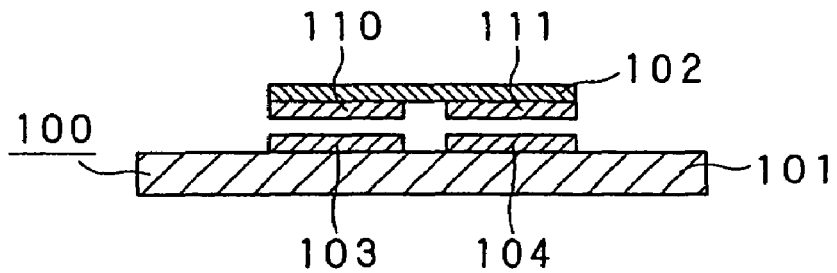
FIG. 1B is a longitudinal cross sectional view in the width direction thereof.
Figure 1C:
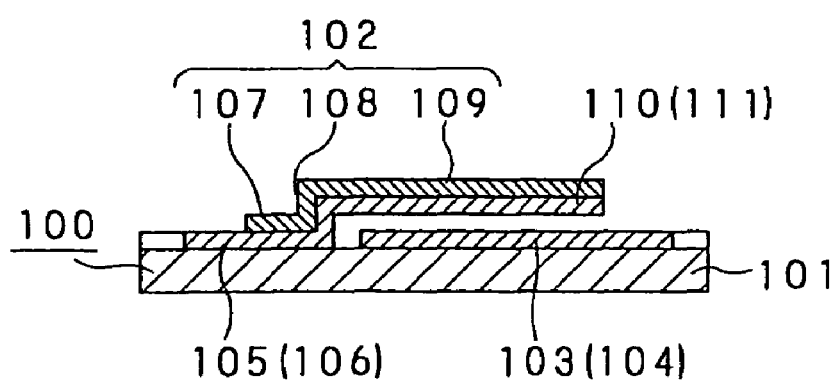
FIG. 1C is an essential part longitudinal cross sectional view in length direction.
Figure 2A:
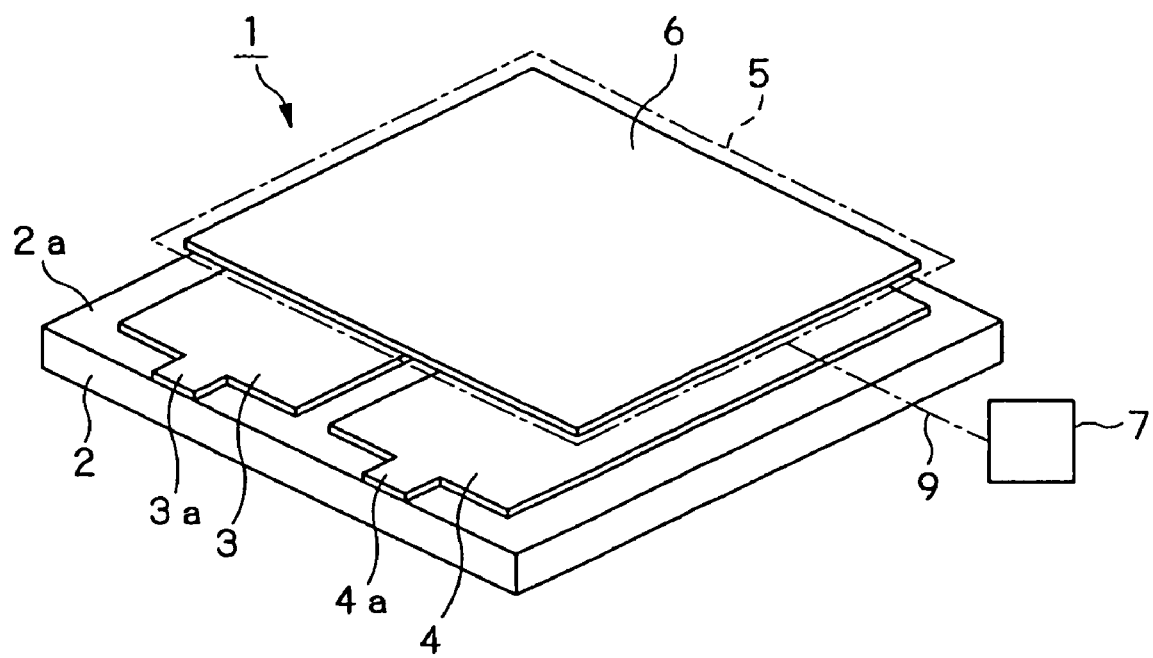
FIG. 2A is an essential part perspective view of a capacitor apparatus of the capacity variable type shown as a first embodiment of the present invention.
Figure 2B:
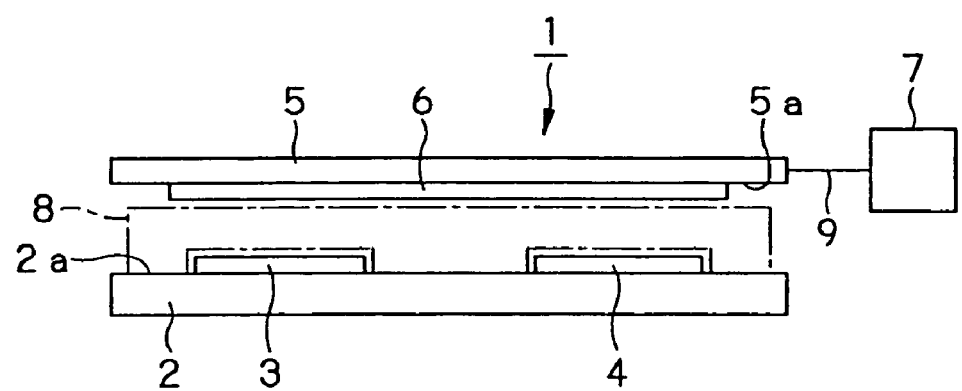
FIG. 2B is an essential part side view thereof.

The capacitor apparatus 1 according to the present invention is manufactured by the MEMS technology so as to indicate micro shape, and is composed, as shown in FIGS. 2A and 2B, of an insulating substrate 2 in which a first capacitor electrode 3 and a second capacitor electrode 4 are formed as film on one surface 2a in the state where insulation therebetweeen is maintained with each other, an actuator 5 in which a conductor 6 is formed on one surface 5a opposite to one surface 2a, and a drive portion 7 for driving this actuator 5. It is to be noted that it is not limited that the capacitor apparatus 1 is manufactured by the MEMS technology, but such capacitor apparatus 1 may be manufactured by the general substrate formation technology, etc.

The insulating substrate 2 is comprised of, e.g., glass substrate, ceramic substrate or silicon substrate having insulating property and which can be formed with satisfactory surface accuracy. The insulating substrate 2 is formed by organic base material having high frequency characteristic, e.g., polyphenol etylene, bismaleimide triazine, polyimide, liquid crystal polymer, phenol resin or polyolefine, etc. and a substrate in which the principal surface has been flattened by implementing abrasive processing, etc. is preferably used.

At the insulating substrate 2, mask for electrode formation having a predetermined punch pattern is disposed on one surface 2a to implement deposition or sputtering processing of metallic material having small electrical resistivity, e.g., aluminum or gold, etc. to thereby form, as film, the first capacitor electrode 3 and the second capacitor electrode 4. As shown in FIG. 2A, the first capacitor electrode 3 and the second capacitor electrode 4 are respectively formed so as to indicate substantially the same rectangular shape, wherein draw-out portions 3a, 4a connected to external circuit are integrally formed. As described later, the first capacitor electrode 3 and the second capacitor electrode 4 respectively deliver produced electrostatic capacitance to external circuit through the draw-out portions 3a, 4a. In this example, after the first capacitor electrode 3 and the second capacitor electrode 4 are formed, mask for electrode formation is detached from the insulating substrate 2.

The actuator 5 is combined with the insulating substrate 2 in the state where a predetermined opposite spacing is spaced with respect to one surface 2a. With respect to the actuator 5, a sacrifice layer 8 (see FIG. 2B) using, e.g., silicon dioxide or suitable organic material as material is formed on one surface 2a of the insulating substrate 2 where, e.g., the first capacitor electrode 3 and the second capacitor electrode 4 are formed as film to form such actuator 5 by using this sacrifice layer. The sacrifice layer 8 is formed as film so as to have a predetermined thickness by arranging mask for sacrifice layer formation having a predetermined punch pattern on one surface 2a of the insulating substarate 2 to implement, e.g., plasma CVD (Chemical Vapor Deposition) processing or sputtering processing, etc. In this example, the mask for formation of sacrifice layer is detached from the insulating substrate 2 after the sacrifice layer 8 is formed.

At the sacrifice layer 8, masks where punch pattern is formed are arranged within regions corresponding to the first capacitor electrode 3 and the second capacitor electrode 4, and deposition processing or sputtering processing, etc. of metallic material having small electrical resistivity, e.g., aluminum or gold, etc. is implemented so that the conductor 6 is formed as film. The conductor 6 is spaced in a manner opposite to one surface 2a of the insulating substrate 2 by thickness of the sacrifice layer 8, and has a rectangular shape having dimensions sufficient to cover the first capacitor electrode 3 and the second capacitor electrode 4. In this example, the mask for formation of conductor is detached from the insulating substrate 2 after the conductor 6 is formed.

At the conductor 6, there is formed the thin plate shaped actuator 5 having external shape slightly greater than the external shape thereof and adapted for covering the entirety. At the actuator 5, mask for formation of actuator is arranged through the conductor 6 on the sacrifice layer 8 to implement, e.g., plasma CVD processing or sputtering processing, etc. to thereby form layer of silicon dioxide, silicon nitride or polycrystalline silicon, etc. having a predetermined thickness. By detaching the mask for formation of actuator, the actuator 5 is adapted so that the above-described conductor 6 is integrated on the surface opposite to the insulating substrate 2.

At the actuator 5, there is formed, e.g., an arm portion 9 having elasticity at one side portion. The arm portion 9 is connected to the drive portion 7 through suitable connecting means. Although the detail is omitted, the actuator 5 is adapted so that the arm portion 9 and the drive portion 7 constitute a supporting portion, and is supported in the state where a predetermined spacing is held with respect to the insulating substrate 2 through this supporting portion. It is to be noted that while the actuator 5 is adapted so that one side portion is cantilever-supported by plural arm portions 9, the actuator 5 may be both holding supported or multi-point supported by arm portions 9 suitably positioned at both side surfaces or outer circumferential side portion.

Although the detail is omitted, the drive portion 7 is constituted by, e.g., electrostatic quantity drive mechanism, electromagnetic drive mechanism or thermo-electro drive mechanism, etc. which carries out vertical operation of the arm portion 9. The drive portion 7 lowers the arm portion 9 down to a predetermined position in accordance with a control signal outputted from control unit (not shown). As shown in FIGS. 2A and 2B, at the drive portion 7, the electric signal system for capacitor where the first capacitor electrode 3 and the second capacitor electrode 4 are connected and independent drive signal system are constituted so that mutual interference is reduced.

At the insulating substrate 2, as described above, the first capacitor electrode 3, the second capacitor electrode 4, and the actuator 5 in which the sacrifice layer 8 and the conductor 6 which cover these electrodes are integrated are formed in a laminated manner on one surface 2a. Thereafter, the sacrifice layer 8 is removed as the result of the fact that chemical etching processing or Reactive Ion Etching processing (RIE), or oxygen plasma etching processing, etc. is implemented to form capacitor apparatus 1. The capacitor apparatus 1 is adapted so that the actuator 5 is opposite to one surface 2a of the insulating substrate 2 through the arm portion 9 in the state where a predetermined spacing is held. The capacitor apparatus 1 constitutes a first capacitor and a second capacitor in which the first capacitor electrode 3 and the second capacitor electrode 4 are connected in series with the conductor 6 being as a common electrode plate.

In the capacitor apparatus 1, electrostatic capacities of the first capacitor and the second capacitor change inversely in proportion to the opposite spacing between the first and second capacitor electrodes 3 and 4 and the conductor 6. In the capacitor apparatus 1 when a control signal is delivered from control unit (not shown) to the drive portion 7, the actuator 5 is caused to undergo movement operation toward the insulating substrate 2 side through the arm portion 9. In the capacitor apparatus 1, opposite spacing between the actuator 5 and the insulating substrate 2, i.e., the opposite spacing between the first and second capacitor electrodes 3 and 4 and the conductor 6 is prescribed in accordance with control signal, and electrostatic capacities of the first and second capacitors change.

In the capacitor apparatus 1, as described above, the conductor 6 of the movable portion-side for changing electrostatic capacitance is independent of the electric signal system of the capacitor, and is caused to be of the structure in which there is no parasitic inductance by draw-out wiring with respect to the first capacitor and the second capacitor. Accordingly, in the capacitor apparatus 1, the first capacitor and the second capacitor are caused to respectively undergo reduction of influence of parasitic inductance so that electrostatic capacity is caused to be changeable. As a result, lowering of the entire resonance frequency is suppressed. Thus, the operation in the high frequency band can be carried out.

Figure 3:
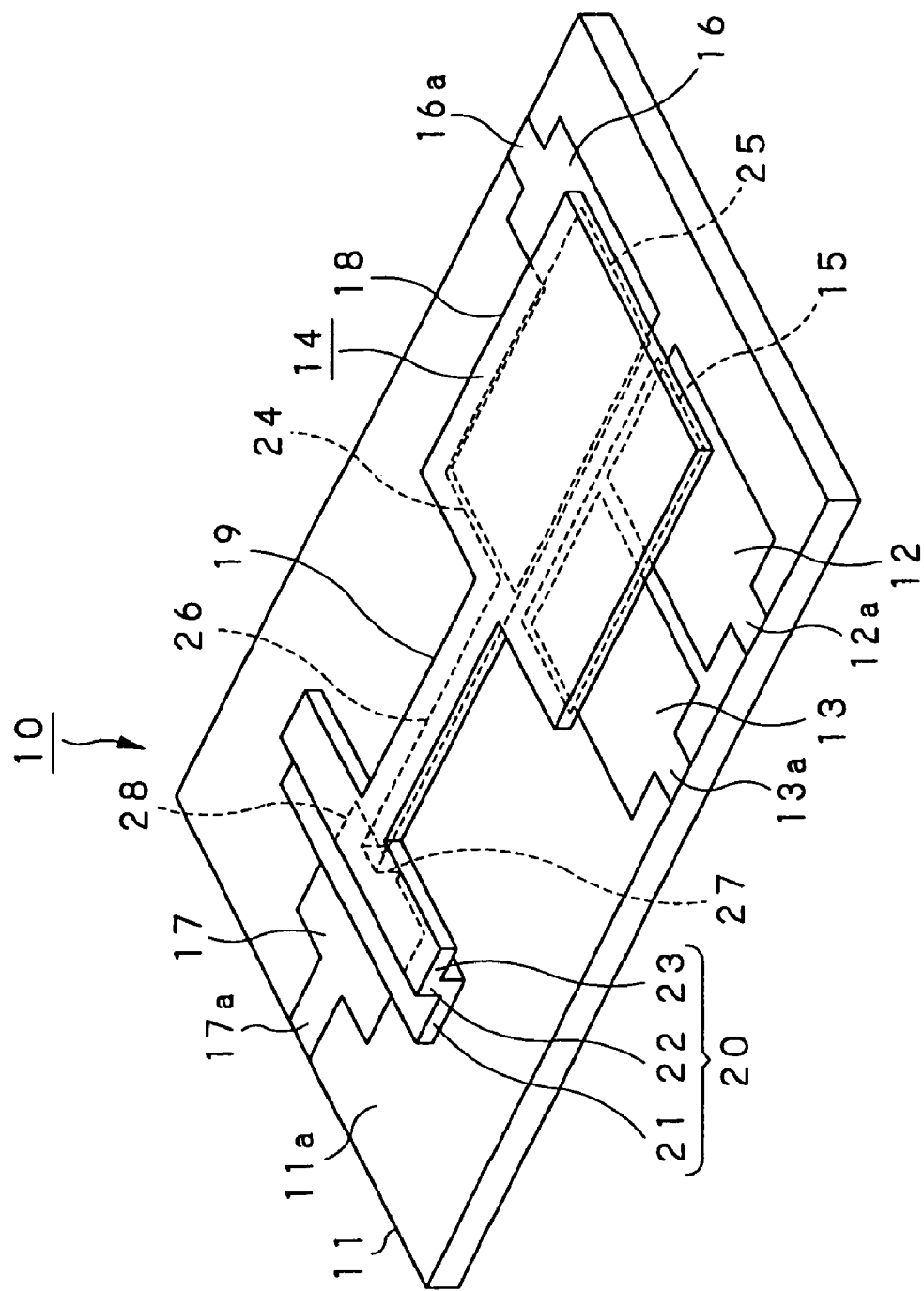
FIG. 3 is an essential part perspective view of a capacitor apparatus of the capacity variable type shown as a second embodiment of the present invention.
Figure 4:
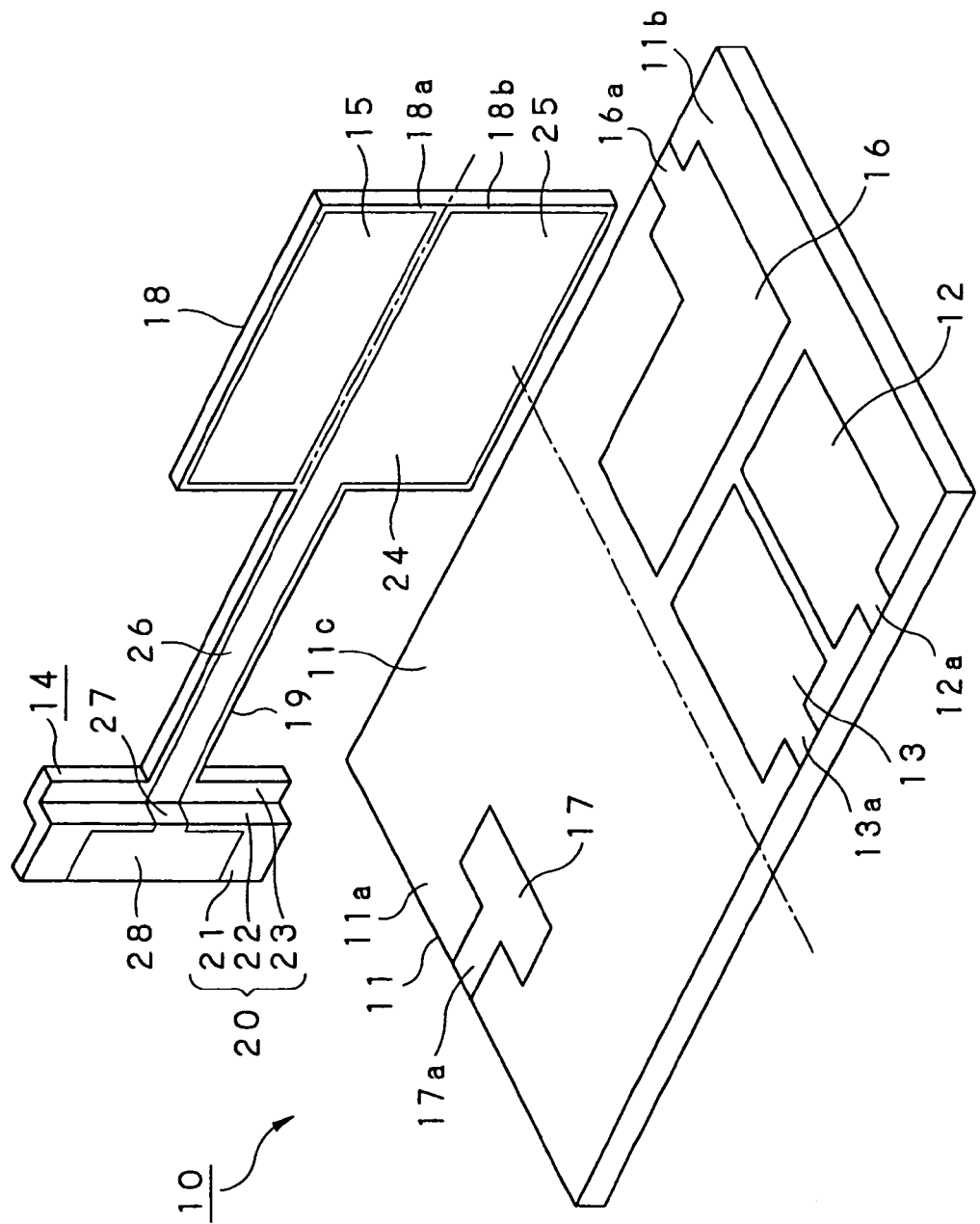
FIG. 4 is an essential part exploded perspective view of the capacitor apparatus of the capacity variable type according to the present invention.

Then, a second embodiment of the present invention will be explained. As shown in FIGS. 3 and 4, the capacitor apparatus 10 of this embodiment is manufactured by the MEMS technology so as to indicate micro shape, and the fundamental configuration comprising an insulating substrate 11 in which a first capacitor electrode 12 and a second capacitor electrode 13 are formed as film on one surface 11a in the state where insulation therebetween is maintained with each other, and an actuator 14 in which a conductor 15 is formed on the principal surface opposite to one surface 11a is similar to the above-described capacitor apparatus 1. This capacitor apparatus 10 is characterized in that it is driven by electrostatic force produced between the actuator 14 and the insulating substrate 11.

The insulating substrate 11 is also comprised of glass substrate, ceramic substrate or silicon substrate. As shown in FIG. 4, at the first region 11b side on one surface 11a partitioned into a first region 11b and a second region 11c in length direction, the first capacitor electrode 12 and the second capacitor electrode 13 are formed in the state arranged in parallel along one side edge in such a manner that insulation therebetween is maintained with each other. The first capacitor electrode 12 and the second capacitor electrode 13 are respectively formed so as to indicate substantially the same rectangular shape, wherein draw-out portions 12a, 13a for electrostatic capacity are respectively drawn and formed at the outer circumferential edge. The first and second capacitor electrodes 12 and 13 are combined with, e.g., inductance element (not shown) and are connected thereto to thereby constitute variable frequency filter or variable frequency transmitter.

At the insulating substrate 11, a first fixed electrode 16 for drive is formed as film on one surface 11a. At the first drive fixed electrode 16, a terminal portion 16a for voltage supply to which drive voltage delivered from control unit (not shown) is applied is formed at one side portion thereof. As shown in FIG. 3, the first drive fixed electrode 16 is formed in parallel state in a manner positioned at one side of the first region 11b with insulation with respect to the first capacitor electrode 12 and the second capacitor electrode 13 being maintained.

At the insulating substrate 11, a second fixed electrode 17 for drive is formed as film on one surface 11a. The second drive fixed electrode 17 is formed in the state positioned substantially at the central portion in the width direction in the vicinity of one end side of the second region 11c. As described later, the second drive fixed electrode 17 is formed in correspondence with fixed position of the actuator 14. At the second drive fixed electrode 17, a voltage supply lead 17a to which drive voltage delivered from control unit (not shown) is applied is formed at one end portion thereof. It is a matter of course that the second drive fixed electrode 17 is adapted so that insulation with respect to the first drive fixed electrode 16, the first capacitor electrode 12 and the second capacitor electrode 13 is maintained.

At the insulating substrate 11, the actuator 14 is cantilever-supported in the state where one end portion is fixed at the second region 11c side. The actuator 14 is formed by base material having flexibility and adapted so that at least the surface opposite to the insulating substrate 11 has insulating property. As shown in FIGS. 3 and 4, the actuator 14 is composed of an integrally formed movable portion 18, an arm portion 19, and a supporting portion 20. At the actuator 14, the supporting portion 20 is composed of a rectangular plate shaped fixed portion 21 directly laminated and formed on one surface 11a of the insulating substrate 11 so that it is integrated, a rising portion 22 formed in a rising manner integrally at one side edge of this fixed portion. 21, and a fulcrum portion 23 bent in horizontal direction from the upper end edge of this rising portion 22. At the actuator 14, at the inner surface opposite to the insulating substrate 11, a drive electrode pattern 24 is formed along with the conductor 15. The drive electrode pattern 24 is composed of a movable electrode portion 25 for drive, a lead portion 26, a rising lead portion 27, and a connection electrode portion 28 for drive.

The movable portion 18 is comprised of a thin thickness rectangular plate-shaped portion having an external shape of the dimensions sufficient to cover the first region 11b of the insulating substrate 11 substantially over the entire region. At the movable portion 18, as shown in FIG. 4, the surface opposite to the insulating substrate 11 is partitioned into two regions 18a, 18b in width direction. At the movable portion 18, the conductor 15 is formed as film within the first region 18a corresponding to the first capacitor electrode 12 and the second capacitor electrode 13. At the movable portion 18, the drive movable electrode portion 25 is formed as film within the second region 18b corresponding to the first drive fixed electrode 16.

The conductor 15 is formed so as to take rectangular shape having external shape of dimensions sufficient to cover the entirety in a manner opposite to the first capacitor electrode 12 and the second capacitor electrode 13. The conductor 15 acts as a common electrode plate with respect to the first capacitor electrode 12 and the second capacitor electrode 13 as described later to constitute the first capacitor and the second capacitor connected in series. The drive movable electrode portion 25 is also formed so as to take rectangular shape of dimensions sufficient to cover the entirety in a manner opposite to the first drive fixed electrode 16. As described later, drive voltage is applied from control unit (not shown) to the drive movable electrode portion 25 through the drive electrode pattern 24 to produce electrostatic force between the drive movable electrode portion 25 and the first drive fixed electrode 16. The conductor 15 and the drive movable electrode portion 25 are adapted so that insulation therebetween is maintained with each other.

At the movable portion 18, as shown in FIG. 4, the arm portion 19 is integrally formed in a projected manner in the state positioned substantially at the central portion in width direction of one side edge portion. The arm portion 19 has a length slightly shorter than opposite spacing between the first drive fixed electrode 16 and the second drive fixed electrode 17 of the insulating substrate 11 side, and is caused to be narrow in width to have flexibility with respect to thickness direction. At the arm portion 19, a lead portion 26 which has been drawn out from the drive movable electrode portion 25 formed at the movable portion 18 is formed as film over the entire region in length direction at the surface opposite to the insulating substrate 11. The arm portion 19 is adapted so that when the actuator 14 is driven in such a manner that the movable portion 18 becomes close to the insulating substrate 11 side as described later, it reduces elastic force to be stored to have ability to obtain large-displacement by small operating voltage. At the arm portion 19, a fulcrum portion 23 of the supporting portion 20 is integrally provided at the front end portion thereof so that it is connected thereto.

The supporting portion 20 is integrally formed in the state where cross sectional shape of the above-described fixed portion 21, rising portion 22 and fulcrum portion 23 is caused to be substantially crank shape. As the result of the fact that the bottom surface of the fixed portion 21 is integrated onto one surface 11a of the insulating substrate 11, the fixed portion 21 cantilever-supports the actuator 14. The rising portion 22 holds the fixed portion 21 and the fulcrum portion 23, i.e., the supporting portion 20 and one surface 11a of the insulating substrate 11 so that they have a predetermined opposite spacing. As the result of the fact that the front end portion of the arm portion 19 is integrated with respect to substantially the central portion of one side edge in length direction, the supporting portion 23 supports this. At the supporting portion 20, the lead portion 26 of the drive electrode pattern 24 formed at the arm portion 19 is extended to the fulcrum portion 23. A rising lead portion 27 formed at the internal surface of the rising portion 22 is continued to this extended end so that it is formed as film. At the supporting portion 20, a connection electrode portion 28 for drive continuous to the rising lead portion 27 is formed as film on the bottom surface of the fixed portion 21.

As shown in FIG. 3, the actuator 14 constituted as described above is cantilever-supported by the insulating substrate 11 in the state where the fixed portion 21 is fixed on one surface 11a. The actuator 14 is held in a manner spaced by a predetermined spacing by the rising portion 22. Thus, the movable portion 18 is opposed to the first region 11b of the insulating substrate 11. At the actuator 14, the conductor 15 formed at the internal surface of the movable portion 18 is opposed to the first capacitor electrode 12 and the second capacitor electrode 13 in such a manner that it bridges over the respective capacitor electrodes 12 and 13 to cover these electrodes to constitute first capacitor and second capacitor. At the actuator 14, the drive movable electrode portion 25 is opposed in a manner to cover the first drive fixed electrode 16. In this case, the drive movable electrode portion 25 and the lead portion 26 of the drive electrode pattern 24 are located at the position where they are not opposed to the first capacitor electrode 12 and the second capacitor electrode 13. Thus, there results a configuration such that there is no influence on the first capacitor and the second capacitor.

At the capacitor apparatus 10, drive voltage delivered from control unit (not shown) is applied to the first drive fixed electrode 16 and the second drive fixed electrode 17. In the capacitor apparatus 10, d.c. drive voltage delivered to the second drive fixed electrode 17 is applied to the drive movable electrode portion 25 formed at the movable portion 18 through the drive electrode pattern 24 drawn out and formed at the surface opposite to the insulating substrate 11 with the drive connection electrode portion 28 of the supporting portion 20 side being as an input unit with respect to the actuator 14.

In the capacitor apparatus 10, electrostatic force is generated between the first drive fixed electrode 16 and the drive movable electrode portion 25 to attract the movable portion 18 of the actuator 14 toward the insulating substrate 11 side. Thus, at the actuator 14, the arm portion 19 is caused to undergo elastic displacement so that the movable portion 18 experiences an operation close to the insulating substrate 111 side. At the actuator 14, elastic force is gradually stored at the arm portion 19 in a manner accompanying with the operation of the this movable portion 18. At the actuator 14, the operation of the movable portion 18 is stopped at the position where electrostatic force between the first drive fixed electrode 16 and the drive movable electrode portion 25 and elastic force stored at the arm portion 19 is balanced, and this state is held.

At the capacitor apparatus 10, opposite spacing between the conductor 15 formed at the movable portion 18 and the first and second capacitor electrodes 12, 13 formed at the insulating substrate 11 is prescribed in a manner accompanying with the operation of the above-described actuator 14. Thus, electrostatic capacities of the first and second capacitors constituted by these components change.

In the capacitor apparatus 10, since electrostatic force generated between the first drive fixed electrode 16 and the drive movable electrode portion 25 changes by magnitude of applied drive voltage, it is possible to control operating quantity of the actuator 14. Accordingly, the capacitor apparatus 10 controls drive voltage, thereby making it possible to take out arbitrary electrostatic capacity.

The capacitor apparatus 10 shown in FIGS. 3 and 4 has the structure in which the electric signal system for capacitor by first capacitor electrode 12, second capacitor electrode 13, and conductor 15 and the drive electric system for the actuator 14 by the first drive fixed electrode 16 and the drive movable electrode portion 25 are independent each other. Accordingly, the capacitor apparatus 10 has the structure draw-out wiring of the drive electric system is not included in the electric signal system for capacitor. Thus, parasitic inductance by draw-out wiring with respect to the first capacitor and the second capacitor is reduced. Thus, in the capacitor apparatus 10, influence of parasitic inductance is reduced in the first capacitor and the second capacitor. As a result, electrostatic capacity is caused to be variable and lowering of the entire resonance frequency is suppressed. The operation in the high frequency band can be carried out.

In the capacitor apparatus 10 of the second embodiment, the fundamental method of forming actuator 14, conductor 15 and respective electrodes on one surface 11a of insulating substrate 11 by making use of the thin film formation technology or the thick film formation technology is caused to be similar to that of the above-described capacitor apparatus 1.

The capacitor apparatus 10 of the second embodiment is characterized in practical formation method for actuator 14 and drive electrode pattern 24. Namely, at the manufacturing process of the capacitor apparatus 10, first capacitor electrode 12, second capacitor electrode 13, first drive fixed electrode 16 and second drive fixed electrode 17 are formed as film on one surface 11a of insulating substrate 11, and sacrifice layer is then formed. In this case, this sacrifice layer is formed as film with a predetermined thickness on one surface 11a of insulating substrate 11 in the state where second drive fixed electrode 17 is exposed. The sacrifice layer is formed on insulating substrate 11 in the state where the region corresponding to fixed portion 21 of actuator 14 is exposed.

In the manufacturing process for the capacitor apparatus 10, electrode formation masks where punch patterns are formed are respectively arranged within regions corresponding to first capacitor electrode 12, second capacitor electrode 13, first drive fixed electrode 16 and second drive fixed electrode 17 on the principal surface of the sacrifice layer. In the manufacturing process for capacitor apparatus 10, deposition processing or sputtering processing, etc. of metallic material having small electrical resistivity, e.g., aluminum or gold, etc. is implemented, whereby conductor 15 opposite to first capacitor electrode 12 and second capacitor electrode 13, and drive electrode pattern 24 opposite to first drive fixed electrode 16 are formed as film on one surface of the sacrifice layer. In the capacitor apparatus 10, since second drive fixed electrode 17 is exposed from the sacrifice layer as described above, the drive connection electrode portion 28 of the drive electrode pattern 24 is integrally formed with respect to this second drive fixed electrode 17.

In the manufacturing process for the capacitor apparatus 10, in the state where electrode formation mask is detached, sacrifice layer is covered on insulating substrate 11 and actuator formation mask in which external shape of actuator 14 is caused to be punch pattern is disposed to implement, e.g., sputtering processing or plasma CVD processing, etc to thereby form, as film, layer consisting of silicon dioxide, silicon nitride or polycrystalline silicon having a predetermined thickness. In the capacitor apparatus 10, since corresponding region of the fixed portion 21 is caused to be non-formation region of the sacrifice layer as described above, this fixed portion 21 is integrated on one surface 11a of insulating substrate 11 so that actuator 14 is formed as film on the sacrifice layer.

In the manufacturing process for the capacitor apparatus 10, the actuator formation mask is detached thereafter to implement chemical etching processing, etc. to thereby remove the sacrifice layer to form the capacitor apparatus 10. In the capacitor apparatus 10, as described above, the fixed portion 21 is fixed on one surface 11a and the actuator 14 to which the movable portion 18 is opposite to one surface 11a with a predetermined opposite spacing through the arm portion 19 is formed in the state where it is cantilever-supported by the insulating substrate 11. It is to be noted that, in the capacitor apparatus 10, actuator formation mask including a punch pattern of suitable shape is used, whereby there is formed, e.g., actuator 14 of both holding supporting or multi-point supporting in which plural arm portions 19 or supporting portions 20 are integrally formed is formed at suitable outer circumferential edge of the movable portion 18.

Figure 5:
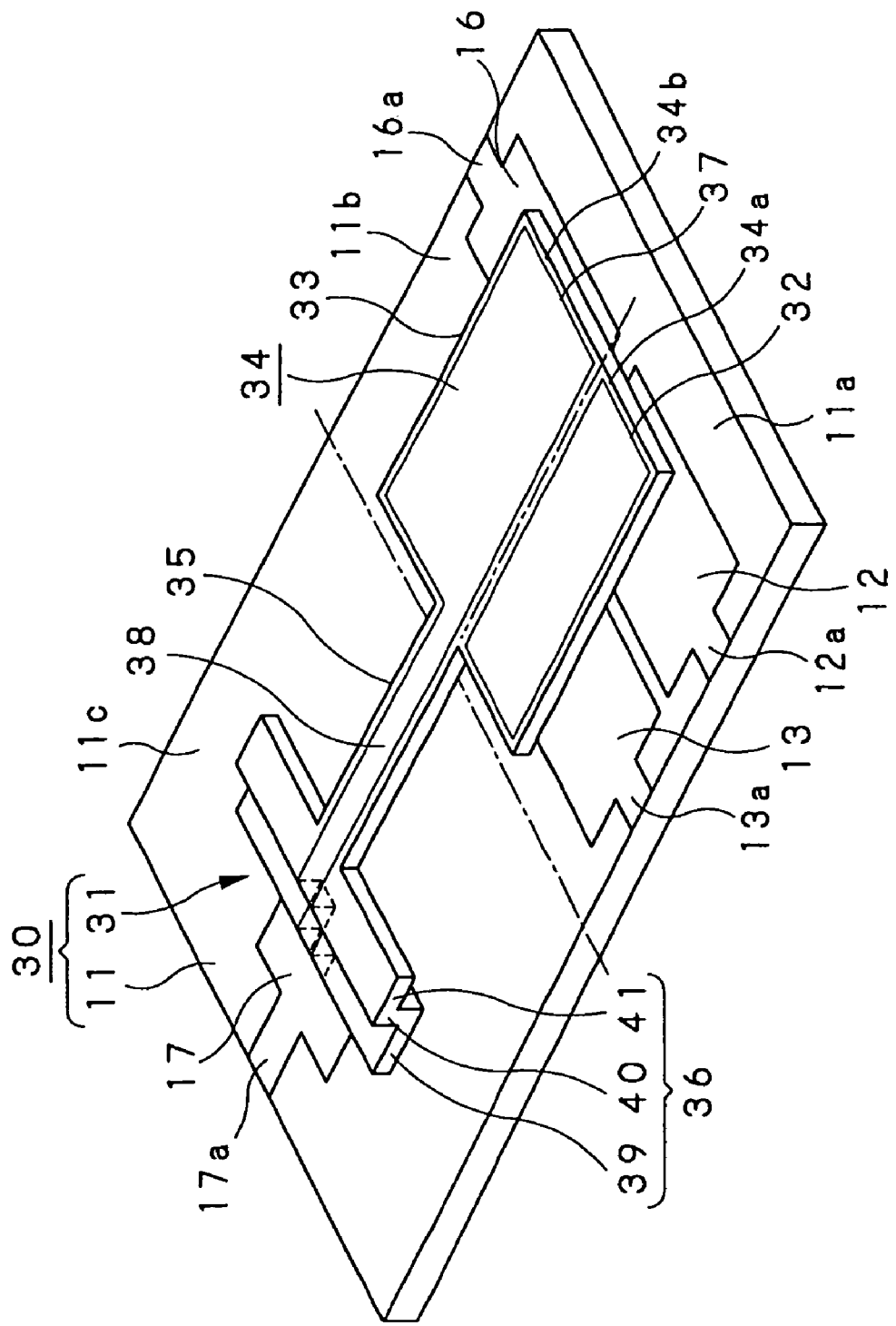
FIG. 5 is an essential part perspective view of a capacitor apparatus of the capacity variable type shown as a third embodiment according to the present invention.

Then, a third embodiment according to the present invention will be explained. As shown in FIG. 5, capacitor apparatus 30 of this embodiment is also manufactured so as to take micro shape by the MEMS technology, and the fundamental configuration comprising insulating substrate 11 in which first capacitor electrode 12 and second capacitor electrode 13 are formed as film on one surface 11a in the state where insulation therebetween is maintained with each other is similar to the above-described capacitor apparatus 10. Accordingly, with respect to the capacitor apparatus 30, common reference numerals are respectively attached to respective portions of the insulating substrate 11 side, and the detailed explanation will be omitted.

The capacitor apparatus 30 of the third embodiment is adapted so that the configuration in which an actuator 31 is cantilever-supported in the state where a predetermined spacing is held with respect to one surface 11a of the insulating substrate 11 is similar to the capacitor apparatus 10, but has the configuration that a conductor 32 is formed as film on the other surface of the opposite side with respect to one surface 11a opposite to the insulating substrate 11 of this actuator 31 and a drive electrode pattern 33 is drawn and formed. Namely, the actuator 31 is similar to the above-described actuator 14 in the fundamental configuration composed of an integrally formed movable portion 34, an arm portion 35 integrally projected substantially at the central portion of one side edge of this movable portion 34, and a supporting portion 36 integrally formed at the other end of this arm portion 35.

The movable portion 34 is comprised of a thin thickness rectangular shaped portion having an external shape of dimensions sufficient to cover first region 11b of insulating substrate 11 substantially over the entire region, and is adapted so that one surface of the actuator 31 is partitioned into two regions 34a, 34b in width direction. At the movable portion 34, the conductor 32 is formed as film within the first region 34a corresponding to the first and second capacitor electrodes 12 and 13 of the insulating substrate 11 side. The conductor 32 takes rectangular shape having external shape of dimensions sufficient to cover the entirety in a manner opposite to the first capacitor electrode 12 and the second capacitor electrode 13. The conductor 32 acts (functions) as a common electrode plate with respect to the first capacitor electrode 12 and the second capacitor electrode 13 through the movable portion 34 to constitute the first capacitor and the second capacitor connected in series.

At the movable portion 34, a movable electrode portion 37 for drive of the drive electrode pattern 33 is formed as film in the state where insulation with respect to the conductor 32 is maintained with each other within the second region 34b corresponding to the first drive fixed electrode 16. The drive electrode pattern 33 is composed of the drive movable electrode portion 37, and a lead portion 38 drawn out and formed at the arm portion 35 and the supporting portion 36. The drive movable electrode portion 37 takes a rectangular shape of dimensions sufficient to cover the entirety in a manner opposite to the first drive fixed electrode 16. A drive voltage is applied from control unit (not shown) to the drive movable electrode portion 37 through the drive electrode pattern 33. Thus, the drive movable electrode portion 37 generates electrostatic force.

The arm portion 35 is caused to be narrow in width to thereby have flexibility with respect to thickness direction to reduce elastic force stored when the actuator 31 is driven to have ability to obtain large displacement by small operating voltage. At the arm portion 35, a fulcrum portion 39 of the supporting portion 36 is integrally connected and provided at the front end portion thereof. Similarly to the above-described actuator 14, the supporting portion 36 is composed of a rectangular plate shaped fixed portion 39 directly laminated and formed on one surface 11a of the insulating substrate 11 so that it is integrated, a rising portion 40 integrally formed in a rising manner along one side edge of this fixed portion 39, and a fulcrum portion 41 bent in horizontal direction from the upper end edge of this rising portion 40, and is integrally formed so that cross sectional shape takes substantially crank shape to hold the movable portion 34 in the state of a predetermined opposite spacing is held with respect to the insulating substrate 11.

At the arm portion 35, the lead portion 38 which has been drawn out from the drive movable electrode portion 37 formed at the movable portion 34 is formed as film over the entire-region in length direction. At the supporting portion 36, the lead portion 38 is formed as film in a manner continuous to the fixed portion 39, the rising portion 40 and the fulcrum portion 41. The lead portion 38 is integrated with the second drive fixed electrode 17 of the insulating substrate 11 side at the lower end portion of the outside surface of the fixed portion 39.

At the capacitor apparatus 30, electrostatic force is generated between the first drive fixed electrode 16 and the drive movable electrode portion 37 to attract the movable portion 34 of the actuator 31 toward the insulating substrate 11 side. Thus, at the capacitor apparatus 30, the arm portion 35 of the actuator 31 is caused to undergo elastic displacement so that the movable portion 34 experiences an operation close to the insulating substrate 11 side. At the capacitor apparatus 30, the actuator 31 is held in the stable state at the position where electrostatic force between the first drive fixed electrode 16 and the drive movable electrode portion 37 and elastic force stored at the arm portion 35 is balanced.

At the capacitor apparatus 30, opposite spacing between the conductor 32 formed at the movable portion 34 and the first and second electrodes 12 and 13 formed at the insulating substrate 11 is prescribed in a manner accompanying with the operation of the above-described actuator 31. Thus, electrostatic capacities of the first and second capacitors constituted by these components change.

Also in the capacitor apparatus 30 of the third embodiment, since electrostatic force generated between the first drive fixed electrode 16 and the drive movable electrode portion 37 changes by magnitude of applied drive voltage, it is possible to control operating quantity of the actuator 31. Accordingly, the capacitor apparatus 30 controls drive voltage, thereby making it possible to take out arbitrary electrostatic capacity.

The capacitor apparatus 30 shown in FIG. 5 also has the structure that the electric signal system for capacitor by the first capacitor electrode 12, the second capacitor electrode 13 and the conductor 32 and the drive electric system for the actuator 31 by the first drive fixed electrode 16 and the drive movable electrode portion 37 are independent each other. Accordingly, the capacitor apparatus 30 has the structure in which draw-out wiring of the drive electric system does not exist in the electric signal system for capacitor. As a result, parasitic inductance by draw-out wiring with respect to the first capacitor and the second capacitor is reduced. Thus, at the capacitor apparatus 30, influence of parasitic inductance is reduced in the first and second capacitors. As a result, electrostatic capacity is caused to be variable and lowering of the entire resonance frequency is suppressed. Thus, the operation in the high frequency band can be carried out.

At the capacitor apparatus 30, the first and second capacitor electrodes 12 and 13 and the conductor 32 which respectively constitute the first and second capacitors are placed in the state electrically isolated by the movable portion 34 of the actuator 31. Accordingly, even in the case where impact, etc is applied to the capacitor apparatus 30, there is no possibility that the first capacitor electrode or the second capacitor electrode 13 and the conductor 32 are directly in contact with each other. Thus, occurrence of excessive current can be securely prevented. In addition, at the capacitor apparatus 30, the actuator 31 is driven until the internal surface of the movable portion 34 comes into contact with one surface 11a of the insulating substrate 11, thereby making it possible to prescribe the maximum values of electrostatic capacities of the first and second capacitors by thickness of the movable portion 34.

At the capacitor apparatus 30, the fundamental method of forming actuator 31, conductor 32 and respective electrodes on one surface 11a of the insulating substrate 11 is similar to that of the above-described capacitor apparatus 10, but the practical formation method for actuator 31, conductor 32 and drive electrode pattern 33 is different therefrom. Namely, in the manufacturing process for the capacitor apparatus 30, first capacitor electrode 12, second capacitor electrode 13, first drive fixed electrode 16 and second drive fixed electrode 17 are formed as film on one surface 11a of the insulating substrate 11, and sacrifice layer is then formed. In this case, this sacrifice layer is formed as film with a predetermined thickness on one surface 11a of the insulating substrate 11 in the state where the second drive fixed electrode 17 is exposed. In addition, the sacrifice layer is formed on the insulating substrate 11 in the state where region corresponding to the fixed portion 39 of the actuator 31 is exposed.

In the manufacturing process for the capacitor apparatus 30 of the third embodiment, sacrifice layer is covered on the insulating substrate 11, and actuator formation mask where external shape of the actuator 31 is caused to be punch pattern is arranged to implement, e.g., sputtering processing or plasma CVD processing, etc. to thereby form, as film, layer consisting of silicon dioxide, silicon nitride or polycrystalline silicon, etc. having a predetermined thickness. In the manufacturing process for the capacitor apparatus 30, since corresponding region of the fixed portion 39 is caused to be non-formation region of the sacrifice layer as described above, this fixed portion 39 is integrated on one surface 11a of the insulating substrate 11 so that silicon dioxide layer corresponding to the actuator 31 is formed as film on the sacrifice layer.

In the manufacturing process for the capacitor apparatus 30, in the state where the actuator formation mask is detached, electrode formation masks where punch patterns are formed are respectively arranged within regions corresponding to conductor 32 and drive electrode pattern 33 on one surface of the actuator 31. In the manufacturing process for the capacitor apparatus 30, deposition processing or sputtering processing, etc. of metallic material having small electrical resistivity, e.g., aluminum or gold, etc. is implemented, whereby conductor 32 opposite to the first capacitor electrode 12 and the second capacitor electrode 13 and drive electrode pattern 33 opposite to the first drive fixed electrode 16 are formed as film on one surface of the actuator 31.

In the manufacturing process for the capacitor apparatus 30, electrode formation mask is detached thereafter to implement chemical etching processing, etc. to thereby remove sacrifice layer to form capacitor apparatus 30. At the capacitor apparatus 30, as described above, actuator 31 in which fixed portion 39 is fixed on one surface 11a and movable portion 34 is opposite to one surface 11a with a predetermined opposite spacing through arm portion 35 is formed in the state where it is cantilever-supported by the insulating substrate 11.

At the capacitor apparatus 30, drive electrode pattern 33 including conductor 35 and drive movable electrode portion 37 is drawn out and formed on one surface. At the capacitor apparatus 30, the drive electrode pattern 33 is drawn out from drive movable electrode portion 37 formed at the movable portion 34 of the actuator 31, and is drawn around at the outside surface of the arm portion 35 and the supporting portion 36. Thus, the drive electrode pattern 33 is integrated with the second drive fixed electrode 17 through the fulcrum portion 41. It is to be noted that at the capacitor apparatus 30, actuator formation mask having a suitable punch pattern may be used to thereby form actuator 31 of both holding support or multi-point support in which, e.g., plural arm portions 35 or supporting portions 36 are integrally formed at the outer circumferential edge of the movable portion 34.

Then, a fourth embodiment of the present invention will be explained. As shown in FIG. 6A, capacitor apparatus 50 according to the fourth embodiment is also manufactured by the MEMS technology so as to indicate micro shape, and is similar to the above-described capacitor apparatus 10 with respect to the fundamental configuration comprising insulating substrate 11 in which first capacitor electrode 12 and second capacitor electrode 13 are formed as film on one surface 11a in the state where insulation therebetween is maintained with each other. As shown in FIG. 6B, the capacitor apparatus 50 is characterized in the configuration in which an insulating body 51 which covers first capacitor electrode 12, second capacitor electrode 13 and first drive fixed electrode 16 formed on one surface 11a of the insulating substrate 11 is formed. Since other configuration comprises the configuration similar to the capacitor apparatus 10 of the previously described first embodiment, the same reference numerals are respectively attached to common portions and the detailed explanation will be omitted.

At the capacitor apparatus 50, as shown in FIG. 6A, first capacitor electrode 12 and second capacitor electrode are formed as film on one surface 11a of the insulating substrate 11 in the state where insulation therebetween is maintained with each other, and first drive fixed electrode 16 and second drive fixed electrode 17 are formed as film in the state where insulation with respect to respective electrodes is maintained. At the capacitor apparatus 50, although not shown, actuator 11 is cantilever-supported with respect to the insulating substrate 11. At the actuator 14, at the internal surface opposite to one surface 11a of the insulating substrate 11, conductor 15 is formed as film in correspondence with the first capacitor electrode 12 and the second capacitor electrode 13, and drive electrode pattern 24 including drive movable electrode portion 25 corresponding to the first drive fixed electrode 16 is formed as film.

In the manufacturing process for the capacitor apparatus 50 of the fourth embodiment, similarly to the manufacturing process for the above-described capacitor apparatus 10, electrode formation mask where the portions corresponding to first capacitor electrode 12, second capacitor electrode 13, first drive fixed electrode 16 and second drive fixed electrode 17 are caused to be punch pattern is arranged on one surface 11a of the insulating substrate 11. In the manufacturing process for the capacitor apparatus 50, deposition processing or sputtering processing, etc. of metallic material having small electrical resistivity, e.g., aluminum or gold, etc. is implemented in this state so that first capacitor electrode 12, second capacitor electrode 13, first drive fixed electrode 16 and second drive fixed electrode 17 are formed as film on one surface 11a of the insulating substrate 11.

In the manufacturing process for the capacitor apparatus 50, in the state where electrode formation mask is detached, the insulating body 51 which covers first capacitor electrode 12, second capacitor electrode 13 and first drive fixed electrode 16 is formed. The insulating body 51 is formed by, e.g., a method of bonding resin film onto one surface 11a of the insulating substrate 11, or arranging mask where a predetermined punch pattern is formed to coat insulating paste, etc. At the insulating body 51, there is no necessity of completely covering the entirety of the first capacitor electrode 12, the second capacitor electrode 13 and the first drive fixed electrode 16. The insulating body 51 may have dimensions intervening between at least these respective electrodes and the conductor portion 15 or the drive movable electrode portion 25 formed at the actuator 14 side. It is to be noted that while the capacitor apparatus 50 is adapted so that insulating body 50 is formed at the insulating substrate 11 side as described above, it is a matter of course that insulating body 51 may be formed at the actuator 14 side.

In the manufacturing process for the capacitor apparatus 50, after formation process for the insulating body 51 is implemented, capacitor apparatus 50 is formed via the above-described formation process for the sacrifice layer, formation process for respective electrodes of the actuator 14 side, formation process for actuator 14, and removal process for sacrifice layer, etc. It is to be noted that in the case where chemical etching processing is implemented to remove sacrifice layer, such a material which is not etched at the same time is selected so that the insulating body 51 is formed.

At the capacitor apparatus 50, first capacitor electrode 12, second capacitor electrode 13, conductor 15 and drive movable electrode portion 25 which constitute the first capacitor and the second capacitor are placed in the state electrically isolated by the insulating body 51. Accordingly, even in the case where impact, etc. is applied to the capacitor apparatus 50, there is no possibility that the first capacitor electrode 12 or the second capacitor electrode 13 and conductor 15 or drive movable electrode portion 25 are directly in contact with each other. Thus, occurrence of excessive current is securely prevented. In addition, at the capacitor apparatus 50, the actuator 14 is driven until the internal surface of the movable portion 18 comes into contact with one surface 11a of the insulating substrate 11 to thereby have ability to prescribe the maximum values of electrostatic capacities of the first and second capacitors by thickness of the insulating body 51.

Figure 7:
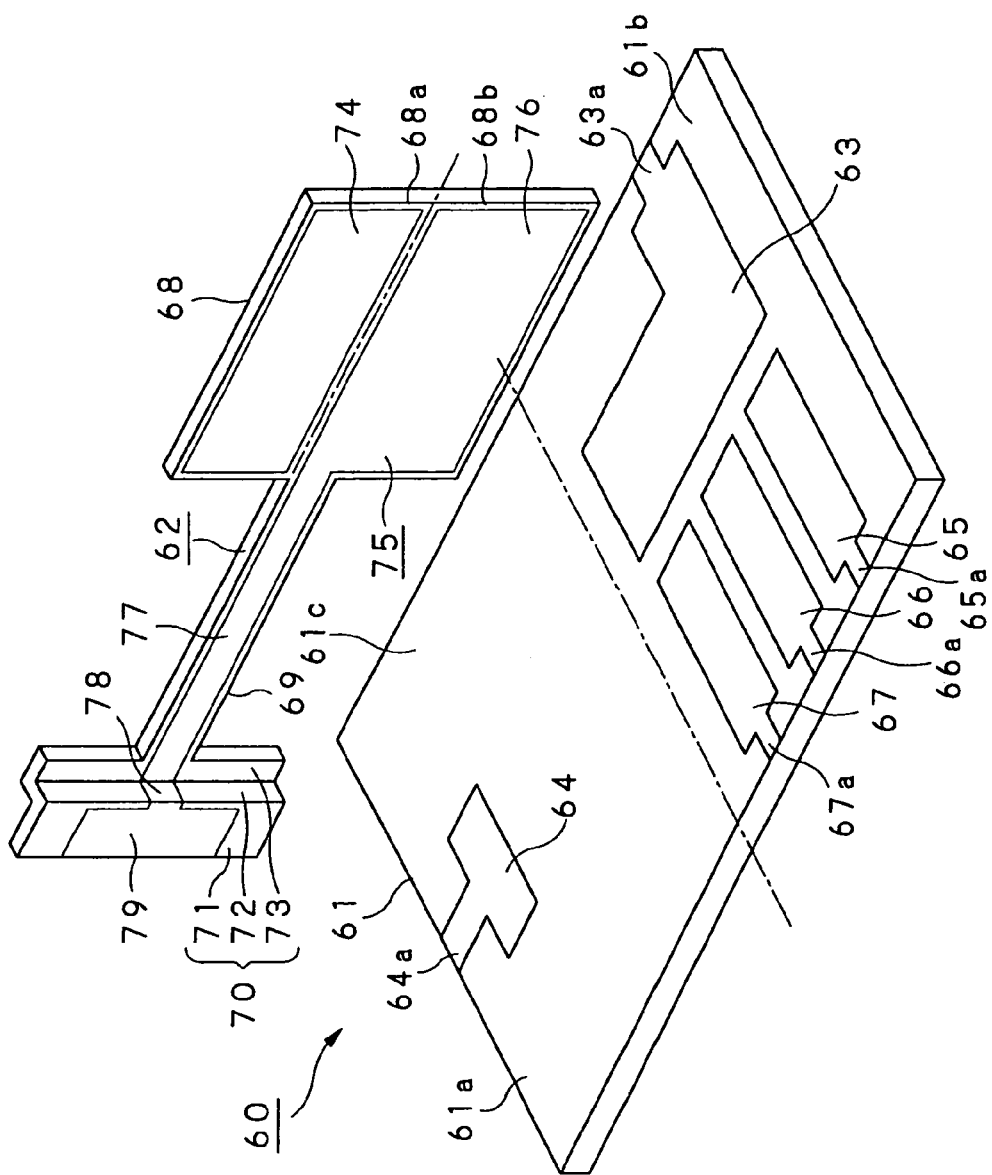
FIG. 7 is an essential part exploded perspective view of a capacitor apparatus of the capacity variable type shown as a fifth embodiment of the present invention.

Then, a fifth embodiment of the present invention will be explained. As shown in FIG. 7, capacitor apparatus 60 according to the fifth embodiment is manufactured by the MEMS technology so as to indicate micro shape, and is similar to the above-described capacitor apparatus 10 with respect to the fundamental configuration in which an insulating substrate 61 is provided and an actuator 62 is assembled with respect to one surface 61a of this insulating substrate 61 so that it comes into contact therewith or is away therefrom. The capacitor apparatus 60 is adapted so that a first drive fixed electrode 63 for drive and a second fixed electrode 64 for drive are formed as film on one surface 61a of the insulating substrate 61 in the state where insulation therebetween is maintained with each other. In this case, the capacitor apparatus 60 is characterized in the configuration in which capacitor electrodes where insulation with respect to these respective electrodes is maintained are composed of first to third capacitor electrodes 65 to 67.

Namely, at the capacitor apparatus 60, laterally elongated rectangular insulating substrate 61 comprised of glass substrate, ceramic substrate or silicon substrate is partitioned into a first region 61b and a second region 61c in length direction. The insulating substrate 61 is adapted so that first capacitor electrode 65 to third capacitor electrode 67 are formed in a manner arranged in parallel in the state where insulation therebetween is maintained with each other along one side edge at the first region 61 side on one surface 61a. The first capacitor electrode 65 to the third capacitor electrode 67 respectively take substantially the same rectangular shape, and are adapted so that draw-out portions 65a to 67a for electrostatic capacity are respectively drawn out and formed at the outer circumferential edge, and are combined with, e.g., inductance elements (not shown) and are connected thereto to constitute variable frequency filter or variable frequency transmitter.

At the insulating substrate 61, the first drive fixed electrode 63 is formed as film in the state positioned at one side of first region 61b of one surface 61a. The first drive fixed electrode 63 includes, at one side portion, a voltage supply lead 63a to which drive voltage delivered from control unit (not shown) is applied. At the insulating substrate 61, the second drive fixed electrode 64 is formed as film in the state positioned substantially at the central portion in width direction in the vicinity of one end side of second region 61c of one surface 61a. The second drive fixed electrode 64 is formed in correspondence with fixed position of the actuator 62. At the second drive fixed electrode 64, there is formed, at one end portion, a voltage supply lead 64a to which drive voltage delivered from control unit (not shown) is applied.

At the insulating substrate 61, the actuator 62 is cantilever-supported in the state where one end portion is fixed at the second region 61c side. The actuator 62 is formed by base material having flexibility and such that at least the surface opposite to the insulating substrate 61 has insulating property. The actuator 62 is composed of a movable portion 68, an arm portion 69 and a supporting portion 70. At the actuator 62, the supporting portion 70 is composed of a rectangular plate-shaped fixed portion 71 directly laminated and formed on one surface 61a of the insulating substrate 61 so that it is integrated, a rising portion 72 formed in a rising manner integrally at one side edge of this fixed portion 71, and a fulcrum portion 73 bent in horizontal direction from the upper end edge of this rising portion 72. At the actuator 62, a conductor 74 and a drive electrode pattern 75 are formed as film at the internal surface opposite to the insulating substrate 61. The drive electrode pattern 75 is composed of a movable electrode portion 76 for drive, a lead portion 77, a rising lead portion 78, and a connection electrode portion 79 for drive.

The movable portion 68 is comprised of thin thickness rectangular plate-shaped portion having external shape of dimensions sufficient to cover first region 61b of the insulating substrate 61 substantially over the entire region. The movable portion 68 is adapted so that the surface opposite to the insulating substrate 61 is partitioned into two regions 68a, 68b in width direction. At the movable portion 68, the conductor 74 is formed as film within the first region 68a corresponding to the first capacitor electrode 65 to the third capacitor electrode 67. At the movable portion 68, the drive movable electrode portion 76 of the drive electrode pattern 75 is formed as film within the second region 68b corresponding to the first drive fixed electrode 63.

The conductor 74 is formed so as to take rectangular shape having external shape of dimensions sufficient to cover the entirety in a manner opposite to the first capacitor electrode 65 to the third capacitor electrode 67. The conductor 74 acts (functions) as a common electrode plate with respect to the first capacitor electrode 65 to the third capacitor electrode 67 as described later to constitute first to third capacitors which are connected in series. The drive movable electrode portion 76 is also formed so as to take rectangular shape of dimensions sufficient to cover the entirety in a manner opposite to the first drive fixed electrode 63. A drive voltage is applied from control unit (not shown) to the drive movable electrode portion 76 through the drive electrode pattern 75 to generate electrostatic force between the drive movable electrode portion 76 and the first drive fixed electrode 63. The conductor 74 and the drive movable electrode portion 76 are electrically insulated.

The arm portion 69 is caused to be narrow in width to thereby have flexibility with respect to thickness direction. At the arm portion 69, at the surface opposite to the insulating substrate 61, the lead portion 77 which has been drawn out from the drive movable electrode portion 76 formed at the movable portion 68 is formed as film extending over the entire region in length direction. The arm portion 69 is adapted so that when the actuator 62 is driven so that the movable portion 68 becomes close to the insulating substrate 61 side, it reduces elastic force to be stored to have ability to obtain large displacement by small operating voltage.

The supporting portion 70 is integrally connected to the front end portion of the arm portion 69, and is integrally formed so that the fixed portion 71 the rising portion 72 and the fulcrum portion 73 take substantially crank shape in cross sectional shape. As the result of the fact that the bottom surface of the fixed portion 71 is integrated on one surface 61a of the insulating substrate 61, the supporting portion 70 cantilever-supports the actuator 62. The supporting portion 70 holds the fixed portion 71 and the fulcrum portion 73, i.e., the movable portion 68 by the rising portion 22 at a predetermined opposite spacing with respect to one surface 61a of the insulating substrate 61. At the supporting portion 70, the lead portion 77 of the drive electrode pattern 75 formed at the arm portion 69 is extended to the fulcrum portion 73, and the rising lead portion 78 formed at the internal surface of the rising portion 72 is continuous to this extended end, and is formed as film. At the supporting portion 70, a connection electrode portion 79 for drive continuous to the rising lead portion 78 is formed as film on the bottom surface of the fixed portion 71.

The actuator 62 is cantilever-supported by the insulating substrate 61 in the state where the fixed portion 71 is integrated on one surface 61. The actuator 62 is adapted so that opposite spacing is held by the rising portion 72 so that the movable portion 68 is opposed to the first region 61b of the insulating substrate 61. At the actuator 62, the conductor 74 formed at the internal surface of the movable portion 68 is opposed in a manner to bridge over the first capacitor electrode 65 to the third capacitor electrode 67 to cover these electrodes thus to constitute the first capacitor to the third capacitor. In addition, at the actuator 62, the drive movable electrode portion 76 is opposed in a manner to cover the first drive fixed electrode 63, but the drive electrode pattern 75 is located at the position which is not opposite to the first capacitor electrode 65 to the third capacitor electrode 67. Thus, there is employed a configuration such that there is no influence on the first capacitor to the third capacitor.

At the capacitor apparatus 60, a drive voltage delivered from control unit (not shown) is applied to the first drive fixed electrode 65 and the second drive fixed electrode 66. At the capacitor apparatus 60, d.c. drive voltage delivered to the second drive fixed electrode 66 is applied to the drive movable electrode portion 76 formed at the movable portion 68 through the drive electrode pattern 75 drawn around and formed at the surface opposite to the insulating substrate 61 with the drive connection electrode portion 79 of the supporting portion 70 side being as input unit with respect to the actuator 62.

In the capacitor apparatus 60 shown in FIG. 7, electrostatic force is generated between the first drive fixed electrode 65 and the drive movable electrode portion 66 to attract the movable portion 68 of the actuator 62 toward the insulating substrate 61 side. Thus, at the actuator 62, the arm portion 69 is caused to undergo elastic displacement so that the movable portion 68 experiences an operation to become close to the insulating substrate 61 side. At the actuator 62, elastic force is gradually stored at the arm portion 69 in a manner accompanying with the operation of this movable portion 68. At the actuator 62, the operation of this movable portion 68 is stopped at the position where electrostatic force between the first drive fixed electrode 64 and the drive movable electrode portion 76 and elastic force stored at the arm portion 69 and the rising portion 72 are balanced, and this state is held.

At the capacitor apparatus 60, opposite spacing between the conductor 74 formed at the movable portion 68 and the first to third capacitor electrodes 65 to 67 formed at the insulating substrate 61 is prescribed in a manner accompanying with the operation of the above-described actuator 62. Thus, electrostatic capacities of the first to third capacitors constituted by these electrodes change.

At the capacitor apparatus 60, since electrostatic force generated between the first drive fixed electrode 63 and the drive movable electrode portion 76 changes by magnitude of applied drive voltage, it is possible to control the operating quantity of the actuator 62. Accordingly, the capacitor apparatus 60 controls drive voltage to thereby have ability to take out an arbitrary electrostatic capacity.

At the capacitor apparatus 60, similarly to the above-described respective capacitor apparatuses, there is employed the structure that the electric signal system for capacitor by the first to third capacitor electrodes 65 to 67 and the conductor 74 and the drive electric system for the actuator 62 by the first drive fixed electrode 63 and the drive electrode pattern 75 including the drive movable electrode portion 76 are independent each other. Accordingly, the capacitor apparatus 60 has the structure that draw-out wiring of the drive electric system does not exist in the electric signal system for capacitor. Thus, parasitic inductance by draw-out wiring with respect to the first to third capacitors is reduced. Thus, at the capacitor apparatus 60, influence of parasitic inductance is reduced in the first to third capacitors. As a result, electrostatic capacity is caused to be variable and lowering of the entire resonance frequency is suppressed. Thus, the operation in the high frequency band can be carried out.

At the capacitor apparatus 60, as described above, first to third capacitors are constituted by the first to third capacitor electrodes 65 to 67 and the conductor 74. At the capacitor apparatus 60, e.g., the second capacitor electrode 66 is caused to be common electrode, and the first and third capacitor electrodes 65 and 67 are caused to be other capacitor electrode, thereby also making it possible to constitute doble operating capacitor which carries out interlocking operation.

Moreover, at the capacitor apparatus 60, as described above, the first to third capacitor electrodes 65 to 67 are respectively formed so as to take the same shape. At the capacitor apparatus 60, e.g., the first to third capacitor electrodes 65 to 67 are formed so that their areas are different from each other, thereby also making it possible to constitute double operating variable capacitor in which electrostatic capacity is variable and its variable range is different.

Further, while first to third capacitor electrodes 65 to 67 are formed as film on one surface 61a of the insulating substrate 61 as described above in the capacitor apparatus 60 of the fifth embodiment, a larger number of capacitor electrodes may be formed. Of course, in such capacitor apparatus, one conductor opposed actuator in a manner bridging over a large number of capacitor electrodes may be formed at the actuator, but plural conductors may be formed at the actuator to constitute independent plural multiple operating capacitors. Such capacitor apparatus constitutes capacitor which can change a large number of electrostatic capacities by respective capacitor electrodes and conductor.

In the capacitor apparatus according to the present invention, specific capacitor electrodes of a large number of capacitor electrodes are caused to be common electrode and others are caused to be capacitor electrode, whereby multiple operating variable capacitor is constituted. Accordingly, in the capacitor apparatus, various inductance elements are combined with respective capacitor electrodes, thereby making it possible to constitute, e.g., multiplex variable frequency filter, multiplex variable frequency oscillator or heterodyne transmitting/receiving circuit, etc.

INDUSTRIAL APPLICABILITY

As described above, the capacitor apparatus of the capacity variable type according to the present invention is adapted to allow actuator in which there is formed as film conductor having dimensions to bridge over respective capacitor electrodes to undergo, by drive means, an operation to come into contact with insulating substrate where at least two capacitor electrodes are formed as film on one surface or to become away therefrom to thereby adjust opposite spacing between respective capacitor electrodes and conductor to constitute capacitor in which electrostatic capacity is variable. Accordingly, in accordance with the capacitor apparatus of the capacity variable type, electric wiring with respect to the conductor of the movable body side becomes unnecessary. From this fact, influence of parasitic inductance is reduced, and lowering of the entire resonance frequency is suppressed. Thus, capacitor in which the operation in the high frequency band can be carried out is constituted.

The capacitor apparatus of the capacity variable type according to the present invention is caused to be of the configuration in which fixed electrode for drive is formed as film on the principal surface of the insulating substrate along with respective capacitor electrodes in the state where insulation with respect thereto is maintained, and movable electrode for drive is formed as film along with the conductor at the actuator side in the state where insulation with respect thereto is maintained to drive the actuator by electrostatic force generated between the drive fixed electrode and the drive movable electrode. Accordingly, in accordance with the capacitor apparatus of the capacity variable type, since the actuator is driven by drive voltage applied to the drive fixed electrode and the drive movable electrode after undergone positioning with high accuracy, capacitor in which low power consumption is realized and accuracy is high is constituted. In addition, in accordance with the capacitor apparatus of the capacity variable type, since the electric signal system for capacitor and the electric signal system for driving actuator are electrically insulated, mutual interference between the electric signal system and the drive signal system utilizing variable capacitor formed at very small spacing is reduced. Thus, capacitor of high accuracy is constituted.

What is claimed is:

1. A capacitor apparatus of the capacity variable type comprising:
   an insulation substrate in which at least two capacitor electrodes are formed on one surface in the state where insulation therebetween is maintained with each other;
   an actuator formed by an insulating material, and having an external shape to bridge over the respective capacitor electrodes on one surface, the actuator being adapted so that a common conductor respectively constituting capacitors are formed between the conductor and the respective capacitor electrodes; and drive means for carrying out an operation to allow the actuator to be in contact with the principal surface of the insulating substrate, or to allow it to be away therefrom, wherein the actuator adjusts opposite spacing between the actuator and the insulating substrate by the drive means, whereby capacitance adjustment of the respective capacitors is carried out; and wherein the drive means is composed of a fixed electrode for drive formed on the principal surface of the insulating substrate in the state where insulation with respect to the capacitor electrode is maintained, and a movable electrode for drive formed at the actuator in correspondence with the drive electrode in the state where insulation with respect to the conductor is maintained, and wherein the actuator is driven by electrostatic force produced between the drive fixed electrode and he drive movable electrode by application of drive voltage;

wherein at least three capacitor electrodes or more are formed on the insulating substrate, and wherein either one of capacitor electrodes is caused to be a common electrode to constitute capacitor by this common electrode and other capacitor electrodes to thereby constitute multiple operating capacitor which carries out interlocking operation each other by the movable electrode and further wherein at least one capacitor electrode has a draw-out portion.

2. The capacitor apparatus of the capacity variable type as set forth in claim 1 wherein the respective capacitor electrodes are formed so that their areas are different from each other.

3. A capacitor apparatus of the capacity variable type comprising:

an insulation substrate in which at least two capacitor electrodes are formed on one surface in the state where insulation therebetween is maintained with each other;

an actuator formed by an insulating material, and having an external shape to bridge over the respective capacitor electrodes on one surface, the actuator being adapted so that a common conductor respectively constituting capacitors are formed between the conductor and the respective capacitor electrodes; and drive means for carrying out an operation to allow the actuator to be in contact with the principal surface of the insulating substrate or to allow it to be away therefrom, wherein the actuator adjusts opposite spacing between the actuator and the insulating substrate by the drive means, whereby capacitance adjustment of the respective capacitors is carried out; and wherein the drive means is composed of a fixed electrode for drive formed on the principal surface of the insulating substrate in the state where insulation with respect to the capacitor electrode is maintained, and a movable electrode for drive formed at the actuator in correspondence with the drive electrode in the state where insulation with respect to the conductor is maintained, and wherein the actuator is driven by electrostatic force produced between the drive fixed electrode and he drive movable electrode by application of drive voltage; and wherein at least three capacitor electrodes or more are formed on the insulating layer, and at least two movable electrodes or more are formed at the actuator in the state where insulation therebetween is maintained with each other, and wherein either two capacitor electrodes or more are caused to be common electrodes to constitute capacitor electrode by the common electrodes and other capacitor electrode or electrodes to thereby constitute multiple operating capacitor which carries out interlocking operation each other by the movable electrode and further wherein at least one capacitor electrode has a draw-out portion.

4. The capacitor apparatus of the capacity variable type as set forth in claim 3 wherein the respective capacitors are formed so that their areas are different from each other.

\* \* \* \* \*